United States Patent
Guerin

(10) Patent No.: US 8,393,435 B2
(45) Date of Patent: Mar. 12, 2013

(54) TRAILING EDGE FOR AN AIRCRAFT ENGINE, OF THE TYPE WITH MOVING CHEVRONS

(75) Inventor: Philipe Guerin, Le Havre (FR)

(73) Assignee: Aircelle, Gonfreville l'Orcher (FR)

( * ) Notice: Subject to any disclaimer, the term of this patent is extended or adjusted under 35 U.S.C. 154(b) by 0 days.

(21) Appl. No.: 12/918,329

(22) PCT Filed: Feb. 26, 2009

(86) PCT No.: PCT/FR2009/000211
§ 371 (c)(1),
(2), (4) Date: Aug. 19, 2010

(87) PCT Pub. No.: WO2009/118472
PCT Pub. Date: Oct. 1, 2009

(65) Prior Publication Data
US 2010/0314194 A1    Dec. 16, 2010

(30) Foreign Application Priority Data
Feb. 29, 2008  (FR) ...................................... 08 01127

(51) Int. Cl.
*F02K 1/08*  (2006.01)
(52) U.S. Cl. .......................................... 181/215; 60/771
(58) Field of Classification Search .................. 181/215, 181/216; 60/226.1, 770, 771, 262
See application file for complete search history.

(56) References Cited

U.S. PATENT DOCUMENTS

| | | | |
|---|---|---|---|
| 3,055,174 A * | 9/1962 | Grotz et al. | 239/265.13 |
| 3,153,319 A * | 10/1964 | Lilley et al. | 239/265.19 |
| 3,161,257 A * | 12/1964 | Young | 181/219 |
| 3,174,282 A | 3/1965 | Harrison | |
| 3,351,155 A * | 11/1967 | Hoch et al. | 181/215 |
| 3,543,877 A * | 12/1970 | Gaston et al. | 181/215 |
| 3,664,455 A * | 5/1972 | Duvvuri | 181/215 |
| 4,279,382 A | 7/1981 | Wilson, Jr. | |
| 5,685,141 A * | 11/1997 | Markstein et al. | 60/204 |
| 5,771,681 A * | 6/1998 | Rudolph | 60/262 |
| 6,360,528 B1 * | 3/2002 | Brausch et al. | 60/262 |
| 6,718,752 B2 * | 4/2004 | Nesbitt et al. | 60/204 |
| 7,308,966 B2 * | 12/2007 | Gupta | 181/215 |

(Continued)

FOREIGN PATENT DOCUMENTS

| | | |
|---|---|---|
| EP | 0913567 A2 | 5/1999 |
| FR | 1164936 A | 1/1957 |

(Continued)

OTHER PUBLICATIONS

International Search Report PCT/FR2009/000211; Dated Aug. 6, 2009.

*Primary Examiner* — Jeremy Luks
(74) *Attorney, Agent, or Firm* — Brinks Hofer Gilson & Lione

(57) ABSTRACT

This trailing edge is of the type with moving chevrons (9a, 9b, 9c). It comprises actuating means able to cause these chevrons (9a, 9b, 9c) to move from a passive position in which they are directed substantially in the direction of the airflow leaving the said engine, into an active position in which at least part of each chevron is inclined with respect to this direction. This trailing edge is notable in that the said active position is derived from the said passive position by pivoting, possibly combined with a translational movement, of at least part of each chevron about an axis (Aa, Ab, Ac) substantially parallel to the said direction.

14 Claims, 1 Drawing Sheet

U.S. PATENT DOCUMENTS

| | | |
|---|---|---|
| 2002/0125340 A1 | 9/2002 | Birch et al. |
| 2004/0031258 A1 | 2/2004 | Papamoschou |
| 2005/0229585 A1* | 10/2005 | Webster ........................ 60/226.1 |
| 2007/0018034 A1* | 1/2007 | Dickau ........................ 244/12.3 |
| 2007/0235080 A1* | 10/2007 | Hocking ........................ 137/85 |

FOREIGN PATENT DOCUMENTS

| | | |
|---|---|---|
| FR | 1255674 A | 4/1960 |
| FR | 1542668 A | 8/1967 |
| FR | 2602550 A | 2/1988 |

\* cited by examiner

TRAILING EDGE FOR AN AIRCRAFT ENGINE, OF THE TYPE WITH MOVING CHEVRONS

TECHNICAL FIELD

This invention relates to a trailing edge for an aircraft engine, of the type with moving chevrons. This invention relates also to a nacelle incorporating such a trailing edge.

BACKGROUND

From the prior art a noise abatement device is known for an aircraft engine, of the type with moving chevrons: these chevrons can be placed on the trailing edge of the exhaust nozzle of the hot gases of a turbojet, and/or on the trailing edge of the outer cowl of the turbojet.

These chevrons are moving between a passive cruse position, wherein they extend in the extension of the walls onto which they are mounted, and thus practically do not interfere with the involved airflow and an active position used during takeoff or landing, in which these chevrons are inclined with respect to the walls on which they are mounted, causing blending of hot air leaving the exhaust nozzle of gases with the cold air originating from the secondary flow, and/or the blending of this cold air with the external air.

With this blending, it is possible to limit the effect of mutual tearing of the different airflows, and thereby reduce the sound level emitted downstream of the turbojet.

A drawback of these moving chevrons of the prior art is that considerable energy needs to be provided to cause them to move from their passive position to their active position, which requires the use of relatively high actuating means.

BRIEF SUMMARY

Therefore, in particular this invention provides a trailing edge of the type with moving chevrons which does not have these drawbacks.

More particularly, the invention provides a trailing edge such as a trailing edge for hot gases exhaust or an aircraft nacelle thrust inverter incorporating a noise abatement device for an aircraft engine of the type with moving chevrons, the trailing edge comprising actuating means causing these chevrons to move from a passive position in which they are directed substantially in the direction of airflow leaving the said engine, to an active position wherein at least a part of each chevron is inclined with respect to this direction, this trailing edge being notable in that the said active position is derived from the said passive position by pivoting, possibly combined with a translation movement of at least a part of each chevron about an axis substantially parallel to the said direction.

Due to these characteristics, actuating of the chevrons in view of obtaining a noise abatement is therefore made by rotating by at least a part of each chevron about a direction parallel to the airflow leaving from the turbojet: during this movement, the chevrons have only a weak air intake leaving from the turbojet (and flowing outside the latter), so as that a relatively small amount of energy is sufficient to cause these chevrons to move from their passive position into their active position.

Thus, actuating means relatively light are sufficient to implement this change of position.

According to other optional characteristics of the trailing edge according to the invention:

the said active position is derived from the said passive position by a set of pivoting of each chevron about the said axis;
the said active position is derived from the said passive position by the torsional deformation of a part of each chevron about the said axis;
each chevron comprises a fixed part and a swiveling mounted moving position, by appropriately hinged means on this fixed part;
each chevron has an originally twisted shape;
the said actuating means are able to cause the vibration of at least part of each chevron about its active position: this actuating vibration, which can be achieved with little energy given the direction of the chevrons according to the direction of the airflows, causes increasing the blending of these flows, and thus achieve even further noise abatement;
the said actuating means comprise elastic returns of each chevron towards the passive position thereof: these means of elastic return cause to be freed from any means of active actuating for returning the chevrons in their active position, which constitutes a safety vis-à-vis the risks of failure of such means of actuating;
at least one part of each chevron is mounted on a rod equipped with a helical groove cooperating with a fixed pawl: this arrangement causes to achieve in a simple way the rotational movement of the chevrons between their active position and their passive position: in fact, it is sufficient to provide a linear actuator able of pushing the rod of each chevron to cause rotation;
the said trailing edge comprises chevrons of different sizes: this causes adapting at best the trailing edge to any given nacelle, and so to optimize noise abatement;
active positions of some of the said chevrons are obtained by pivoting in the opposite direction with respect to the active positions of other chevrons: this pivoting possibility in the opposite direction provides an increased acoustic effectiveness;
the said chevrons are mounted projecting;
the said chevrons are mounted in inlay;
the said chevrons are distributed only on a part of the circumference of the said trailing edge.

This invention also relates to a nacelle for an aircraft engine, notable in that it comprises at least one trailing edge complying with the above.

According to other optional characteristics of this nacelle:
the said chevrons are arranged on the trailing edge of the exhaust nozzle of gases of this nacelle;
the said chevrons are arranged on the trailing edge of the thrust inverter of this nacelle.

BRIEF DESCRIPTION OF THE DRAWINGS

Other characteristics and advantages of this invention will become evident in the light of the following description and by the examination of the hereby attached figures, wherein.

DETAILED DESCRIPTION

Figure 1:
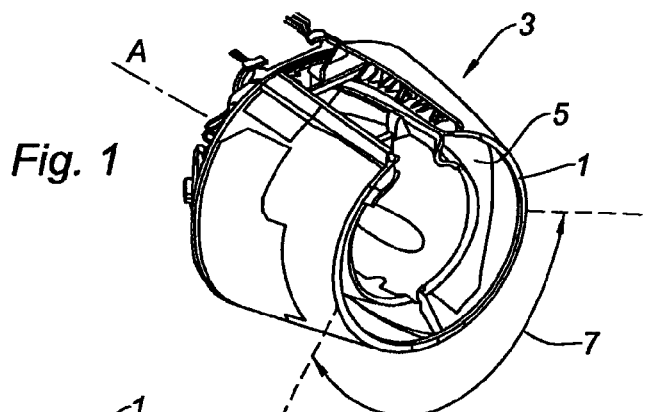
FIG. 1 is a perspective view of a rear part of the nacelle for a turbojet aircraft intended to be equipped with a trailing edge according to the invention.

Referring to FIG. 1, it can be observed that the trailing edge according to the invention can be arranged for example on the rear edge 1 of a thrust inverter 3 of a nacelle aircraft.

This rear edge 1 is located at the boundary between the outside airflow flowing along the nacelle and the cold airflow generated by the turbojet fan, and flowing in a stream of cold air 5.

The chevrons forming the trailing edge according to the invention can be arranged across the entire circumference of the trailing edge 1, or only a part of this circumference, as symbolized by arrow 7 in FIG. 1.

Figure 2:
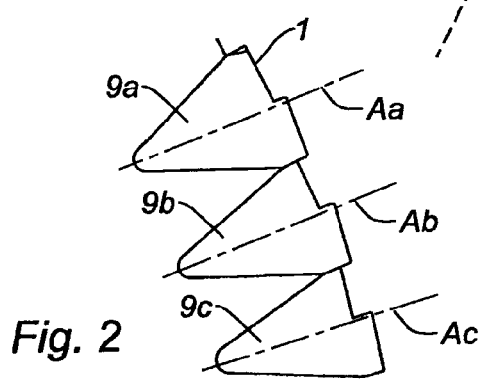
FIG. 2 is a perspective view of three chevrons according to the invention in passive position.
Figure 3:
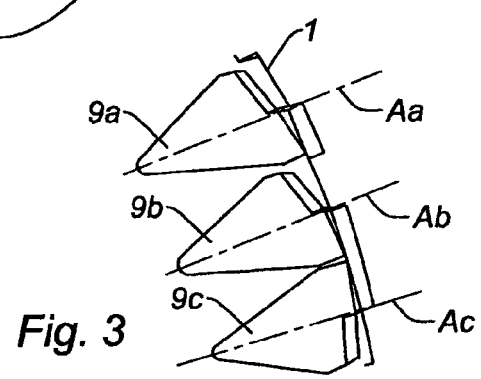
FIG. 3 is a view similar to that of FIG. 2, the three chevrons being shown in active position

Referring to FIGS. 2 and 3, it can be observed that the trailing edge according to the invention therefore comprises a plurality of chevrons 9a, 9b, 9c, that is to say plates of substantially triangular shape, the acute tips of these triangles being directed towards the rear of the nacelle.

According to a characteristic of the invention, chevrons 9a, 9b, 9c are mounted on the trailing edge 1 being able to rotate about respective axes Aa, Ab and Ac substantially parallel to the airflow inside the nacelle 3.

In other words, these axes Aa, Ab and Ac are each substantially parallel to axis A of the nacelle 3, shown in FIG. 1.

In its normal cruising position, chevrons 9a, 9b, 9c are arranged as shown in FIG. 2, that is to say they are arranged in the extension of the trailing edge 1 of the nacelle, so as to have a minimum intake of airflow flowing through the cold air stream 5 as well as to the outside of this nacelle.

In situations of takeoff or landing, where it is important to have an abatement of the noise emissions from the nacelle, each chevron 9a, 9b, 9c is pivoted about its respective axis Aa, Ab and Ac, as shown in FIG. 3, so as to prevent the airflow flowing on the one hand inside the cold air stream 5 and on the other hand outside of the nacelle.

As shown in FIG. 3, the two chevrons, 9a, 9b can pivot in a first direction, and the third chevron 9c can pivot in a second direction opposite the first.

Figure 4:
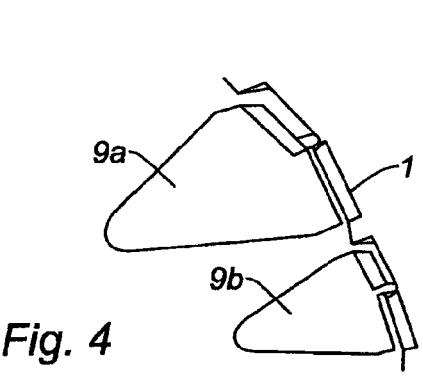
FIG. 4 shows in passive position two chevrons made in accordance with an embodiment of the invention

It may also be provided, as shown in FIG. 4, that all the chevrons do not have the same size, depending on the acoustic optimization needs.

Figure 5:
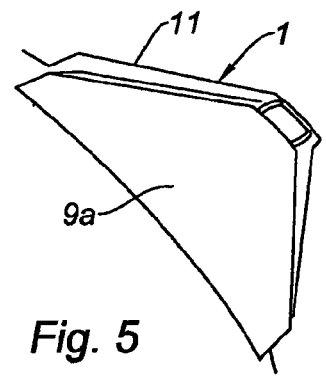
FIG. 5 shows in perspective a chevron made by yet another embodiment of the invention.

It may also be provided, as shown in FIG. 5, that the chevrons, instead of projecting downstream of the rear edge 1 of the nacelle, are in fact each arranged in a well 11 of complementary shape, formed within the trailing edge 1.

Figure 6:
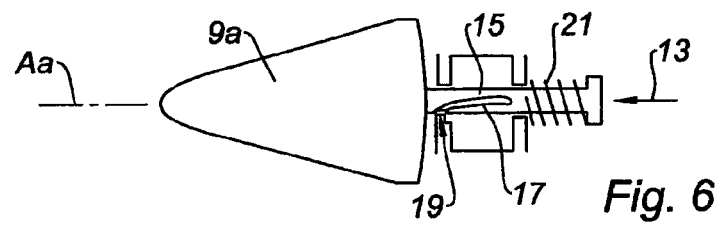
FIG. 6 shows a side view of a chevron according to the invention and its actuating mechanism.

It can be observed with more precision, by referring to FIG. 6, a possible embodiment of actuating means for the chevrons 9, causing them to move from their passive position to their active position, and vice versa.

As it is shown in this FIG. 6, there can be a linear, electric, electromagnetic or hydraulic actuator, able to exert a thrust effort according to the direction Aa of the chevron 9a, as indicated by arrow 13.

Chevron 9a is mounted on a rod 15 having a helical groove 17 able of cooperating with a fixed pawl 19.

Thus, under the effect of the thrust 13, the helical groove 17 scrolls on the pawl 19, causing rotation of the chevron 9a along with its movement rearward of the nacelle.

Resilient means such as a spring 21 are arranged so that when the thrust force 13 ceases, the chevron 9a returns to its passive position, after having pivoted in the opposite direction.

It will be observed that it can be advantageously provided that the actuating means causing to exert the thrust 13 are endowed with a vibration capacity, thus causing the chevrons to vibrate about their active position.

The operation method and the advantages of the trailing edge which have been hereby described, result directly from the foregoing.

In the phase of landing or takeoff, that is to say when it is important to have a significant abatement of the noise emitted by the turbojet of an aircraft, the chevrons are caused to move from their passive position, as shown in FIG. 2, to their active position, as shown in FIG. 3, wherein these chevrons interfere with the airflow flowing on both sides of the wall on the trailing edge 1 onto which they are mounted.

This interference with these airflows can promote blending of these two airflows, and thus limit the effects of mutual tear of these airflows, sources of very strong acoustic waves.

Both in their passive position and in their active position, the chevrons extend according to the direction of airflows, so that only a little energy is needed to cause them to move from one position to the other of these positions: low-dimensioned actuator means can therefore be used, such as electrical actuators, available on the market.

The weight problem inherent to the use of these actuators may thereby be reduced.

The presence of elastic return means 21 causes the return of the chevrons to their passive position even when the actuator means fail, which constitutes a safety feature.

Of course, this invention is not limited to the embodiment described and shown above, provided as a simple non limiting example: the number of chevrons, their circumferential distribution, their direction of rotation, their respective sizes, as well as their installation location (on the rear edge of a thrust inverter or on the rear edge of an exhaust nozzle of hot gases) can indeed vary considerably while staying within the framework of this invention.

This is also how an embodiment could be considered wherein each chevron would comprise a solidly mounted part onto the trailing edge 1, and a moving part mounted in rotation, by appropriate hinge means, onto this fixed part.

This is still how it could be considered that each chevron is formed in a deformable material, the movement from the passive position to the active position being therefore effected by torsional deformation of the chevron by appropriate actuating means.

This is still how it could be considered that each chevron has an originally slightly twisted shape, so as to increase the penetration of the chevron in the related airflow when driven into rotation.

This is still how the teachings of this invention could be extended to other trailing edges other than those of a turbojet nacelle, such as those of wings or the tail group of an aircraft.

The invention claimed is:

1. Noise abatement device for the trailing edge of a nozzle exhaust of hot gases or of an aircraft nacelle thrust inverter, said noise abatement device comprising:
    a plurality of moving chevrons disposed on a trailing edge of an exhaust nozzle of a turbojet or on a trailing edge of an outer cowl of the turbojet, the chevrons being disposed adjacent a first direction of airflow from a first side of the trailing edge and a second direction of airflow from a second side of the trailing edge;
    an actuating means able to cause the chevrons to move from a passive position in which the chevrons extend according to the first and second directions of airflow leaving the engine, into an active position in which at least part of each chevron is inclined with respect to the first and second directions of airflow, the actuating means being a low-dimensioned actuator means;

wherein the active position is derived from the passive position by pivoting, combined with a translational movement, of at least part of each chevron about an axis substantially parallel to the first and second directions of airflow.

2. Noise abatement device according to claim 1, wherein the active position is derived from the passive position by a pivoting set of each chevron about the axis.

3. Noise abatement device according to claim 1, wherein the active position is derived from the passive position by deformation, by twisting, of part of each chevron about the axis.

4. Noise abatement device according to claim 1, wherein each chevron comprises a fixed part and a moving part mounted in rotation, by means of appropriate hinges onto the fixed part.

5. Noise abatement device according to claim 1, wherein each chevron has an originally twisted shape.

6. Noise abatement device according to claim 1, wherein the actuating means are able to cause a vibration of at least part of each chevron about the active position thereof.

7. Noise abatement device according to claim 1, wherein the actuating means comprise return elastic means of each chevron towards the passive position thereof.

8. Noise abatement device according to claim 1, wherein at least part of each chevron is mounted on a rod equipped with a helical groove cooperating with a fixed pawl.

9. Noise abatement device according to claim 1, further comprising chevrons of various sizes.

10. Noise abatement device according to claim 1, wherein the active positions of some of the chevrons are obtained by pivoting in an opposite direction with respect to the active positions of other chevrons.

11. Noise abatement device according to claim 1, wherein the chevrons are mounted projecting.

12. Noise abatement device according to claim 1, wherein the chevrons are mounted in inlay.

13. Noise abatement device according to claim 1, wherein the chevrons are only distributed on one part of a circumference of the trailing edge.

14. Noise abatement device for the trailing edge of a nozzle exhaust of hot gases or an aircraft nacelle thrust inverter, said noise abatement device comprising:
    a plurality of moving chevrons disposed on a trailing edge of an exhaust nozzle of a turbojet or on a trailing edge of an outer cowl of the turbojet, the chevrons being disposed adjacent a first direction of airflow from a first side of the trailing edge and a second direction of airflow from a second side of the trailing edge;
    an actuating means able to cause the chevrons to move from a passive position in which the chevrons extend according to the first and second directions of airflow leaving the engine, into an active position in which at least part of each chevron is inclined with respect to the first and second directions of airflow, the actuating means being a low-dimensioned actuator means;
    wherein the active position is derived from the passive position by pivoting at least part of each chevron about an axis substantially parallel to the first and second directions of airflow.

* * * * *